United States Patent
Lumini

(10) Patent No.: US 11,052,714 B2
(45) Date of Patent: Jul. 6, 2021

(54) AUTOMOTIVE SUSPENSION FOR A SPORT CAR

(71) Applicant: FERRARI S.p.A., Modena (IT)

(72) Inventor: Sandro Lumini, Modena (IT)

(73) Assignee: FERRARI S.P.A., Modena (IT)

(*) Notice: Subject to any disclaimer, the term of this patent is extended or adjusted under 35 U.S.C. 154(b) by 115 days.

(21) Appl. No.: 16/409,989

(22) Filed: May 13, 2019

(65) Prior Publication Data
US 2019/0351723 A1 Nov. 21, 2019

(30) Foreign Application Priority Data
May 16, 2018 (IT) .................. 102018000005419

(51) Int. Cl.
*B60G 3/18* (2006.01)
*B60G 7/00* (2006.01)
*B60G 15/06* (2006.01)

(52) U.S. Cl.
CPC .............. *B60G 3/18* (2013.01); *B60G 7/001* (2013.01); *B60G 15/062* (2013.01); *B60G 2204/46* (2013.01)

(58) Field of Classification Search
CPC ........ B60G 3/18; B60G 7/001; B60G 15/062; B60G 2204/46; B60G 2500/10; B60G 2500/22; B60G 2200/142; B60G 2200/144; B60G 2202/12; B60G 2202/152; B60G 2202/44; B60G 2204/127; B60G 2204/129; B60G 2204/421; B60G 2204/422; B60G 2204/424; B60G 2204/4502; B60G 2300/27; B60G 2800/91; B60G 15/067; B60G 13/005
See application file for complete search history.

(56) References Cited

U.S. PATENT DOCUMENTS

| | | | | |
|---|---|---|---|---|
| 5,356,162 A * | 10/1994 | Derrien | .............. | B60G 11/04 280/43.18 |
| 5,435,590 A * | 7/1995 | Larsson | .............. | B60G 3/00 280/93.502 |
| 8,408,559 B1 * | 4/2013 | Lee | .............. | B60G 21/0553 280/5.508 |

(Continued)

FOREIGN PATENT DOCUMENTS

| | | |
|---|---|---|
| DE | 102009004150 A1 | 2/2011 |
| EP | 0991535 B1 | 4/2000 |
| WO | 2005105489 A1 | 11/2005 |

OTHER PUBLICATIONS

International Search Report issued in Italian Application No. 201800005419, completed Jan. 9, 2019; 9 pages.

*Primary Examiner* — Drew J Brown
(74) *Attorney, Agent, or Firm* — Cantor Colburn LLP

(57) ABSTRACT

An automotive suspension for a sports car comprising a lower oscillating arm and a shock absorber having a relative end connected with a first intermediate part of the lower oscillating arm by means of a connecting rod having a first end hinged with said end of the shock absorber and a relative second end, opposite to the first end, hinged with said first intermediate part, locking means for locking said connecting rod in a stable position ranging between two extreme positions wherein said first end of the connecting rod is in a position close to or distal relative to the frame of the car.

14 Claims, 1 Drawing Sheet

(56) References Cited

U.S. PATENT DOCUMENTS

| | | | | |
|---|---|---|---|---|
| 8,608,186 B2* | 12/2013 | Lee | .................... | B60G 21/0553 |
| | | | | 280/124.106 |
| 8,690,177 B2* | 4/2014 | Buchwitz | .............. | G06F 16/245 |
| | | | | 280/124.135 |
| 2002/0130479 A1* | 9/2002 | Eckelberry et al. | ..... | B60G 9/00 |
| | | | | 280/124.109 |
| 2005/0248116 A1 | 11/2005 | Fanson | | |
| 2019/0009632 A1* | 1/2019 | Holt | .................. | B60G 17/0272 |
| 2019/0111746 A1* | 4/2019 | Yamazaki | ................ | B60G 3/22 |
| 2020/0062064 A1* | 2/2020 | Riedel | .................. | B60G 15/068 |
| 2020/0101806 A1* | 4/2020 | Riedel | ...................... | B60G 3/20 |

* cited by examiner

AUTOMOTIVE SUSPENSION FOR A SPORT CAR

CROSS-REFERENCE TO RELATED APPLICATIONS

This patent application claims priority from Italian patent application no. 102018000005419 filed on May 16, 2018, the entire disclosure of which is incorporated herein by reference.

TECHNICAL FIELD OF THE INVENTION

The invention relates to the field of automotive suspensions for sports cars.

STATE OF THE ART

High-performance sports cars are often adjusted so as to allow them to also race in a track.

Among the car members changed in order to do so there are the suspensions.

The suspensions generally comprise a hub, to which a wheel is connected in a rotary manner. The hub is connected to the frame of the car by means of a lower oscillating arm, which has a first end hinged to the frame of the car and a second end, opposite the first one, hinged to the hub.

In multi-link suspensions, the shock absorber has a first end hinged to the frame of the car in a point operatively above the hinging point of the lower oscillating arm and a second end, opposite the first one, hinged to the lower oscillating arm, thus forming a sort of triangle, whose geometry varies depending on the extension and shortening of the shock absorber, when stressed by the irregularities of the road or by the load changes of the car.

We call "effective arm" the fixed distance between the axis of the shock absorber and the hinging point of the lower oscillating arm of the suspension to the vehicle frame.

The conditions of the road surface of a racing track are very different from the conditions of the road surface of public roads; therefore, the vehicle is homologated with an attitude representing a compromise between performance and comfort, taking into account the irregularities of public roads.

When the vehicle is used in a racing track, the attitude needs to be changed in order to obtain optimal performances. In order to do so, attitude changing kits are available, which allow the car to be lowered and the dynamics of the suspensions to be changed, thus obtaining a so-called "racing" attitude.

The kit, depending on the type of suspension, can comprise the sole shock absorbers or the suspension completed with shock absorbers, oscillating arms and possible torsion bars.

These kits are relatively expensive and must be transported to the track to be installed; furthermore, they need to be stored between uses.

If not specifically excluded by the detailed description below, the information contained in this part should be considered as an integral part of the detailed description itself.

SUMMARY OF THE INVENTION

The object of the invention is to provide a suspension capable of changing the attitude of a sports car, obtaining both the lowering thereof and an overall stiffening of the suspension.

The idea on which the invention is based is that of connecting the shock absorber to the lower oscillating arm by means of a connecting rod, which can assume at least two stable extreme positions, reducing or increasing, respectively, the effective arm of the suspension.

The connecting rod is preferably arranged in the space operatively above the lower oscillating arm, but this is not necessarily so.

The arm of the suspension is altered according to the two stable extreme positions assumed by the connecting rod, identifying a "road" and a "track" configuration.

A linear actuator can be implemented to operate the connecting rod moving it between one operating condition and the other. The implementation of the actuator is not mandatory, since the car can be lifted and the shifting of the connecting rod can be manually operated.

When the linear actuator is implemented, it can define locking means, which make the position of the respective connecting rods stable. In this case, potentially infinite stable configurations can be identified by operating the connecting rods between the aforesaid at least two stable extreme positions.

In the road configuration, the effective arm of the suspension is reduced, thus allowing for greater travels of the relative wheel and for a greater distance of the body of the car from the ground. This ensures a greater comfort while driving on an irregular surface, avoiding at the same time contacts of the bottom of the car with the ground.

On the contrary, in the "track" configuration, the effective arm of the suspension increases and, therefore, the suspension—as a whole—is stiffer, with reduced travels of the wheel, and at the same time the body of the car is closer to the ground.

The linear actuator preferably has a first end hinged in the hinging point of the lower oscillating arm to the frame of the car and a second end, opposite the first one, hinged in the mutual hinging point between the shock absorber and the connecting rod.

Locking means or stop elements, which are independent of the actuator, can be implemented in order to lock the angular position of the connecting rod relative to the lower oscillating arm, so as to make the configuration of the suspension stable between the two aforesaid extreme positions. These stop elements can be obtained in the hinge between the shock absorber and the connecting rod and/or between the connecting rod and the lower oscillating arm. Advantageously, when the linear actuator is hinged to the frame in the same hinging point as the lower oscillating arm or is hinged in a second intermediate part of the lower oscillating arm and independent locking means are implemented, it is completely inactive and foreign to any stress in the configuration assumed by the connecting rod and made stable by the locking means.

The actuator preferably is a hydraulic or pneumatic actuator, but an electric actuator can also be implemented. Evidently, the hinging axes are all parallel to one another, such as for example the axis of the hinge between the connecting rod and the lower oscillating arm, between the lower oscillating arm and the frame of the car, between the shock absorber and the connecting rod and between the linear actuator and the connecting rod and the shock absorber and between the actuator and the frame of the car. The invention allows users to obtain a change in the attitude of the car, namely a change in the stiffness of the suspensions and in the distance between the body of the car and the ground, through implementing helical springs.

According to the description, by "shock absorber" we mean at least one spring, regardless of whether it is obtained by means of a helicoid or an air cushion.

The shock absorber can also include a dampening portion or the dampening portion can be separate and be installed elsewhere relative to the longitudinal element herein indicated as "shock absorber".

The dampening portion of the shock absorber can be of any type: it can be pneumatic or hydraulic and it can be passive, semi-active or active according to known devices.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

The axes of the hinges of the suspension are all approximately parallel to the longitudinal development of the car.

In the figures, the same numbers and the same reference letters indicate the same elements or components.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

DETAILED DESCRIPTION OF EMBODIMENTS

Figure 1:
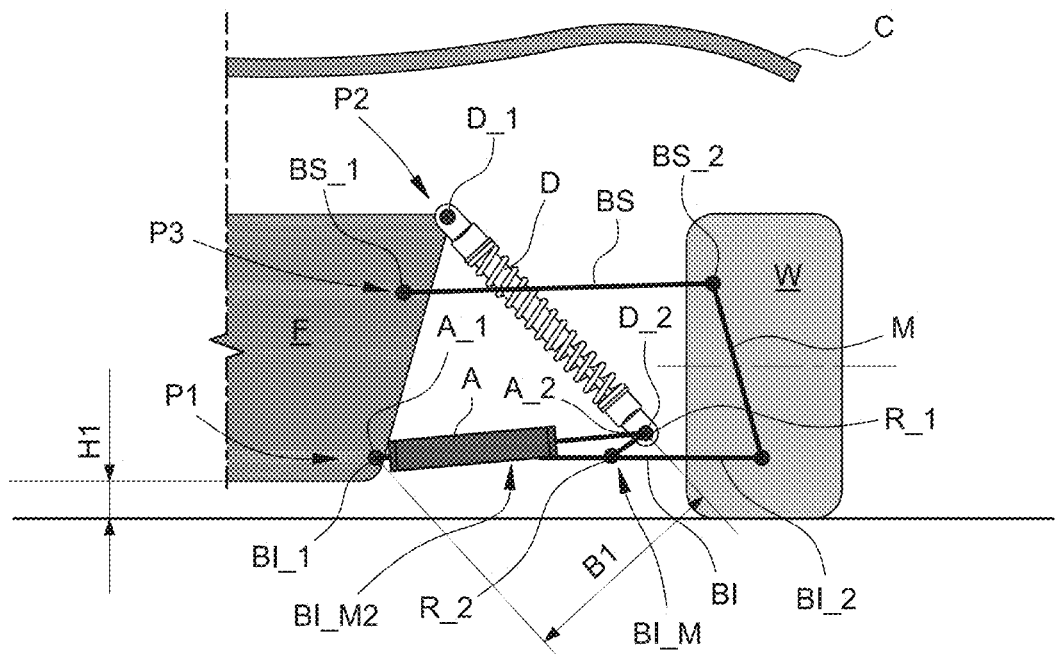
FIG. 1 shows, according to an axial view parallel to the longitudinal development of a sports car, a first operating condition of an implementing example of the suspension according to the invention.
Figure 2:
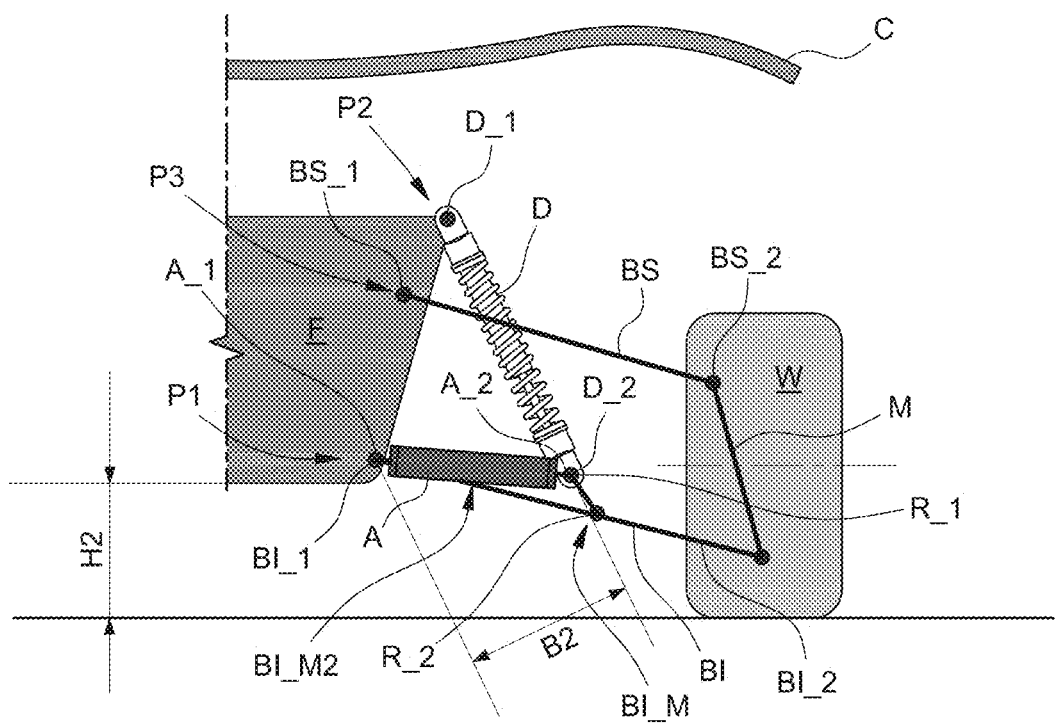
FIG. 2 shows, according to the axial view of FIG. 1, a second operating condition of the same implementing example of FIG. 1.

With reference to FIGS. 1 and 2, the automotive suspension according to the invention comprises a lower oscillating arm BI having a first end BI_1 hinged to a frame F of a car C in a first point P1 and a relative second end BI_2, opposite the first end, connected to a hub M adapted to support a wheel in a rotary manner.

The shock absorber D has a first end D_1 hinged to the frame F in a second point P2 operatively above said first point P1 and a relative second end D_2, opposite the first end, connected to a first intermediate part BI_M of the lower oscillating arm BI included between said first end BI_1 and said second end BI_2.

So far, the suspension seems similar to the one of the prior art.

Unlike the prior art, though, the second end D_2 of the shock absorber is connected to said first intermediate part BI_M of the lower oscillating arm BI by means of a connecting rod R having a first end R_1 hinged to said second end D_2 of the shock absorber and a relative second end R_2, opposite the first end R_1, hinged to said first intermediate part BI_M.

Locking means are implemented in order to lock the connecting rod in a stable position arranged between two extreme positions, wherein, in a first extreme position, the first end R_1 of the connecting rod R is in a position—see FIG. 2—close to the first end BI_1 of the lower oscillating arm BI and, in a second extreme position, opposite the first one, the first end of the connecting rod R is in a distal position—see FIG. 1—relative to the first end BI_1 of the lower oscillating arm BI, which is hinged to the frame of the car.

FIG. 2 shows the so-called road configuration, in which the first end of the connecting rod R is close to the frame F of the car.

Therefore, an effective arm B2 is defined and there is a distance H2 between the body C of the car and the ground.

FIG. 1 shows the so-called track configuration, in which the first end of the connecting rod R is distal relative to the frame F of the car.

Therefore, a greater effective arm B1 is defined and there is a distance H1, which is smaller than H2.

In order to shift the connecting rod, it is sufficient to unlock the locking means and lift the frame of car until the longitudinal development of the shock absorber is almost aligned with the longitudinal development of the connecting rod.

"Almost" means "aligned with some degrees of deflection".

The connecting rod is manually operated so as overcome the condition of alignment with the shock absorber, thus forming a knee that is opposite than before.

After having carried out the operation on all the suspensions of at least one axle of the car or of both axles of the car, the frame can be released so that it can lower itself resting again on the relative suspensions.

The stable position assumed by the connecting rod can be defined by setting the locking means before or during the release of the frame.

Alternatively, a linear actuator A can be implemented, which has a first end A_1 directly or indirectly connected to the frame F and a relative second end A_2, opposite the first one, hinged to said connecting rod R.

By so doing, a retraction of the actuator moves the first end R_1 of the connecting rod R close to the frame F of the car, whereas an extension of the actuator moves said first end R_1 to a distal position relative to the frame.

If the linear actuator also serves as locking means, infinite intermediate positions can be identified between the extreme positions of the connecting rod.

Generally speaking, the suspension of a sports car is connected to the frame F by means of a so-called tower, namely a sturdy element comprising a plate, the attachments for the levers and/or the shock absorber of the suspension and stiffening elements, such as ribs.

Under operating conditions, said plate is substantially vertical.

The second end A_2 of the actuator A can be hinged to the first end R_1 of the connecting rod and to the second end D_2 of the shock absorber forming a single hinge or can be hinged in an intermediate part of the connecting rod comprised between the relative opposite ends R_1 and R_2.

The first end of the actuator A_1 can be hinged, in the aforesaid first point P1, together with the first end BI_1 of the lower oscillating arm BI forming a single hinge; alternatively, said first end A_1 of the actuator A can be hinged to a second intermediate part BI_M2 of the lower oscillating arm BI, which is different from said first intermediate part BI_M.

The second intermediate part BI_M2 of the lower oscillating arm is preferably comprised between the first intermediate part BI_M and the first end BI_1 so as reduce unsprung masses. Nevertheless, the second intermediate part BI_M2 can be comprised between the first intermediate part BI_2 and the second end BI_2 of the lower oscillating arm.

The shock absorber preferably comprises a metal helical spring. Furthermore, the shock absorber can also comprise a dampening portion of the hydraulic and/or pneumatic type.

Said dampening portion can be passive or semi-active or active. The terms "passive", "semi-active" and "active" are known to a person skilled in the art of suspensions.

The damper can be implemented independently of the element D herein indicated as "shock absorber".

As far as the linear actuator A is concerned, it can be of any nature. What matters is that it is capable of moving the relative second end A_2 to a position close to or distal relative to the respective first end A_1. Hence, it can be pneumatic or hydraulic or electric, for example an electric motor provided with a gearmotor with rack.

Especially when it is hydraulic, a closing of the solenoid valves controlling the linear actuator causes the actuator to stop in a configuration without any waste of energy.

The locking means to lock the connecting rod at least in the two aforesaid extreme positions can also be buffers fixed on the connecting rod R and/or on the lower oscillating arm BI or can be interference elements associated with the hinges created by the hinging between the first end R_1 of the connecting rod R and the first intermediate part BI_M and/or between the second end R_2 of the connecting rod R and the second end D_2 of the shock absorber D.

In this case, the sole possible stable positions are the extreme positions, whereas, when the linear actuator also serves as locking means, infinite stable positions can be assumed between the two aforesaid extreme positions.

It should be clear that locking means other than the liner actuator can be implemented without implementing the linear actuator. It is possible to implement locking means different from the linear actuator, which only fulfils the task of operating the connecting rod. Alternatively, the sole linear actuator can be implemented and serve both as actuator of the connecting rod and as locking means of the connecting rod.

The suspension according to the invention can follow any conventional and unconventional scheme.

For example, it can define a Mc Pherson or multi-link scheme, for instance with the shape of an articulated parallelogram.

When the scheme defined by the suspension is a multi-link scheme, the suspension further comprises an upper oscillating arm BS having a first end BS_1 hinged to the frame F and a relative second end BS_2 hinged to the hub M. The first end BS_1 of the upper oscillating arm BS is hinged to said frame in a third point P3 operatively intermediate between said first point P1 and said second point P2.

The non-limiting example described above can be subjected to variations, without for this reason going beyond the scope of protection of the invention, comprising all embodiments that, for a person skilled in the art, are equivalent to the content of the claims.

When reading the description above, a skilled person can carry out the subject-matter of the invention without introducing further manufacturing details.

The invention claimed is:
1. An automotive suspension for a sports car, comprising a lower oscillating arm (BI) having a first end (BI_1) hinged with a frame (F) of said car in a first point (P1) and a relative second end (BI_2), opposite to the first end (BI_1), connected with a hub (M) adapted to support a wheel (W) in a rotatable manner,
a shock absorber (D) having a first end (D_1) hinged with said frame (F) in a second point (P2), operatively above said first point (P1) and a relative second end (D_2), opposite to the first end (D_1), connected with a first intermediate part (BI_M) of the lower oscillating arm (BI) included between said first end (BI_1) and said second end (BI_2),
wherein said second end (D_2) of the shock absorber (D) is connected with said first intermediate part (BI_M) of the lower oscillating arm (BI) by means of a connecting rod (R) having a first end (R_1) hinged with said second end (D_2) of the shock absorber (D) and a relative second end (R_2), opposite to the first end (R_1), hinged with said first intermediate part (BI_M),
wherein the suspension comprises a locking means (A) independent from an actuator for locking said connecting rod in a stable position ranging between two extreme positions wherein, in a first extreme position, said first end (R_1) of the connecting rod (R) is in a position close to said frame (F) and, in a second extreme position, said first end (R_1) of the connecting rod (R) is in a position distal to said frame (F),
wherein said locking means are fixedly positioned on said connecting rod (R) and/or on said lower oscillating arm (BI) or are associated in the hinging between said first end (R_1) of the connecting rod (R) with said first in intermediate part (BI_M) and/or between said second end (R_2) of the connecting rod (R) with said second end 10 (D_2) of the shock absorber (D).

2. The suspension according to claim 1, further comprising a linear actuator having a first end (A_1) connected with the frame (F) and a relative second end (A_2), opposite to the first, hinged with said connecting rod (R).

3. The suspension according to claim 2, wherein said second end (A_2) of the actuator (A) is hinged with said first end (R_1) of said connecting rod and with said second end (D_2) of said shock absorber forming a single hinge.

4. The suspension according to claim 2, wherein said first end of the actuator (A_1) is hinged in said first point with said first end (BI_1) of said lower oscillating arm (BI) forming a single hinge.

5. The suspension according to claim 2, wherein said first end (A_1) of the actuator (A) is indirectly connected with the frame (F) being hinged with a second intermediate part (BI_M2) of the lower oscillating arm (BI), different from said first intermediate part (BI_M).

6. The suspension according to claim 2, wherein said linear actuator defines said locking means which are able to stop said connecting rod in any position ranging between said two extreme positions.

7. The suspension according to claim 2, wherein said linear actuator (A) is an electric linear actuator, a hydraulic linear actuator or a pneumatic linear actuator.

8. The suspension according to claim 1, wherein said shock absorber comprises a metal coil spring or an air cushion.

9. The suspension according to claim 1, wherein said shock absorber comprises a hydraulic and/or a pneumatic dampening portion.

10. The suspension according to claim 9, wherein said dampening portion is of an active dampening portion or a semi-active dampening portion or a passive dampening portion.

11. The suspension according to claim 1, defining a MacPherson or a multi-link scheme.

12. The suspension according to claim 11, further comprising an upper oscillating arm (BS) having a first end (BS_1) hinged with said frame (F) and a relative second end (BS_2) hinged with said hub (M).

13. The suspension according to claim 12, wherein said first end (BS_1) of the upper oscillating arm (BS) is hinged with said frame in a third point operatively intermediate between said first and second point.

14. The sports car comprising a suspension according to claim 1.

* * * * *